FIG. 6

United States Patent Office 3,425,129
Patented Feb. 4, 1969

3,425,129
MEASURING APPARATUS
Ragnar Gudmestad, West Allis, Wis., assignor to Artos Engineering Company, Milwaukee, Wis., a corporation of Wisconsin
Filed Mar. 14, 1966, Ser. No. 534,170
U.S. Cl. 33—132         20 Claims
Int. Cl. G01b 5/04; B65h 25/04

ABSTRACT OF THE DISCLOSURE

Apparatus for measuring a desired length of material, and more particularly, apparatus for repetitively measuring lengths of a filament or elongated material from a continuous supply thereof in preparation for a cutting, printing, wrapping or other subsequent operation.

SUMMARY

The measuring apparatus of this invention provides for accurate measurement of any desired length of material while being adapted for rapid repetitive operation and the device is quickly and easily adjustable to measure different lengths.

Referring to the latter criterion, adjustment of the apparatus of the present invention to measure different lengths requires only that a single dial or indicator be set rather than the numerous indicators required in prior art devices, particularly those employing digital counters. Further, the apparatus is infinitely adjustable and is not limited to a minimum increment of adjustment as are those employing digital techniques.

The measuring apparatus of the present invention moreover is inexpensive to construct and maintain and is capable of substantially trouble free operation for substantial periods of time.

Briefly, the present invention provides an apparatus for measuring a desired length of material and comprises a sensor driven by the passage of the material past the sensor, a transport mechanism operable by the sensor to move an elongated means a distance proportional to the desired length of the passing material, and a means responsive to the movement of the elongated means the proportional distance to indicate measurement of the desired length of material, the responsive means providing a signal to the cutoff machine, printer or other associated apparatus to terminate the measuring operation.

The following specification, taken in conjunction with the drawings forming a part thereof, more fully describes the apparatus of the present invention along with the features thereof.

THE DRAWINGS

In the drawings:

FIGURES 8 and 9 are sectional views of the clock spring mechanism employed in the transport mechanism of the measuring apparatus, FIGURE 8 being taken along the line 8—8 of FIGURE 4 and FIGURE 9 being taken along the line 9—9 of FIGURE 8;

DETAILED DESCRIPTION

Figure 1:
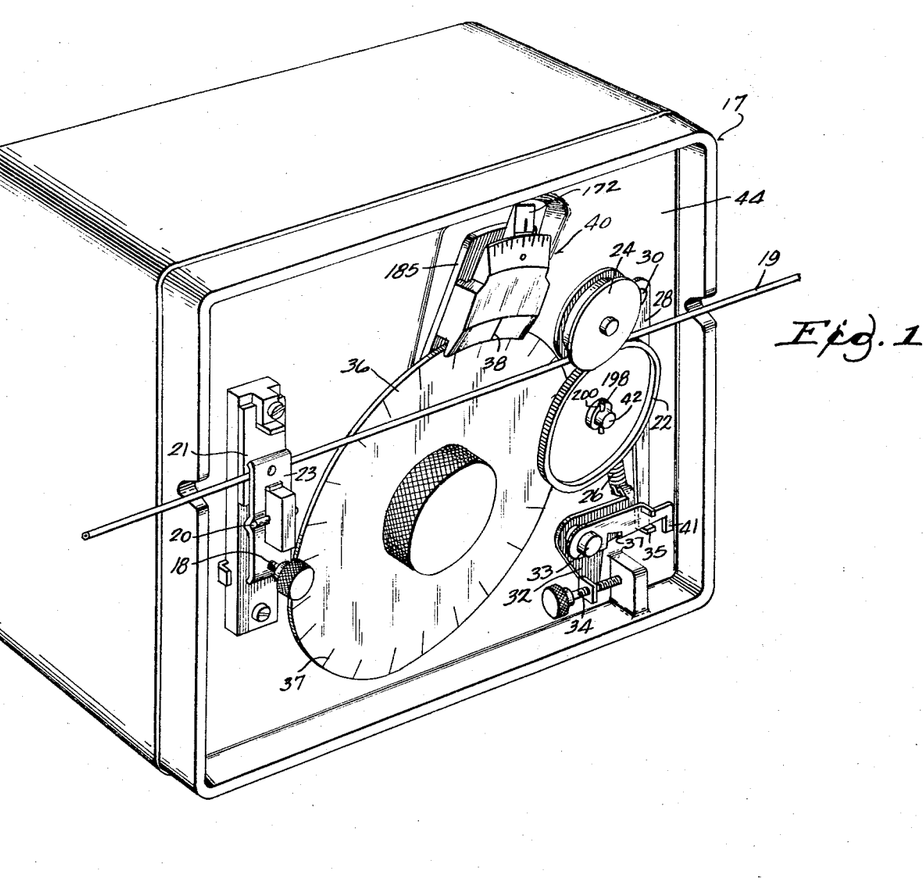
FIGURE 1 is a perspective view of the measuring apparatus of the present invention.

Referring to the drawings which illustrate a typical embodiment of the invention, FIGURE 1 shows the measuring apparatus 17 in perspective. While the apparatus is shown in FIGURE 1, and in the other figures herein, as being particularly adapted for the measurement of lengths of a filament or wire 19, it will be appreciated that the apparatus may be used to measure many other types of linear material.

Figures 2, 3:
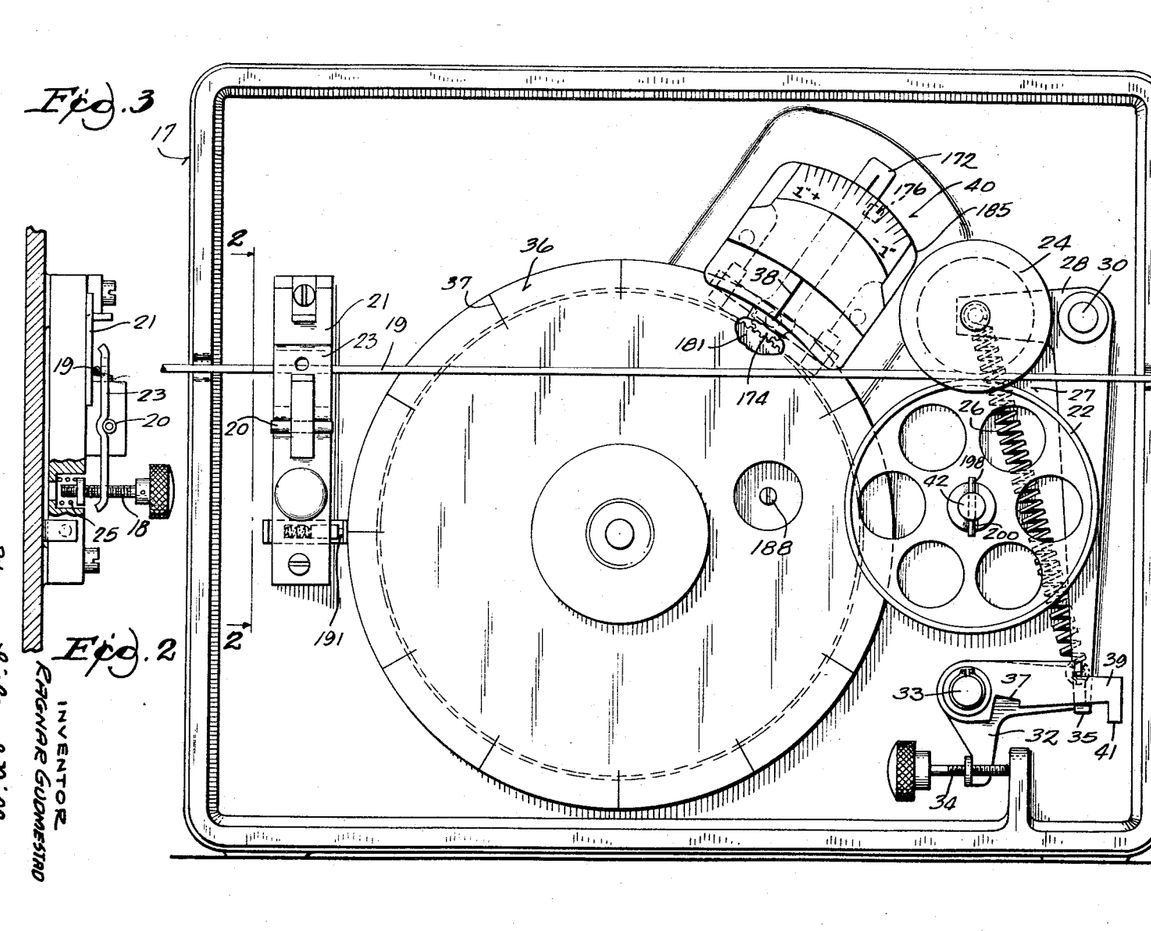
FIGURE 2 is a fragmentary, partially sectionalized, side or end view of the linear material tensioning elements of the measuring apparatus.
FIGURE 3 is a front view of the measuring apparatus of the present invention showing the sensor, the desired measured length indicating and adjustment means, and the tensioning elements.

Initially, a wire 19 is inserted in the measuring device 17 by placing it between pressure plate 21 and pressure pad 23 as shown in FIGURES 1 and 2. The pressure exerted by these elements is controlled by a screw 18 which moves pad 23 about pivot 20. As may be noted from the drawings, both pressure plate 21 and pressure pad 23 are constructed so that the position of each may be reversed when the portion thereof in contact with wire 19 becomes worn from the passage of the wire. This prolongs the useful life of these parts. Screw 18 and pressure pad 23 are spring biased into position by a spring 25 which permits the upper end of pad 23 to be moved away from pressure plate 21 to allow insertion of wire 19 when screw 18 and the lower end of pad 23 are pressed inward.

The wire 19 is also placed in the sensor 27 of apparatus 17. This sensor 27 consists of a knurled measuring wheel 22 and pressure roller 24. Pressure roller 24 is mounted on lever 28 pivoted on shaft 30, as seen most clearly in FIGURE 3. The amount of pressure by which pressure roller 24 forces wire 19 against the knurled circumferential surface of measuring wheel 22 is determined by the tension in a spring 26 attached thereto which pulls roller 24 downward. This tension is adjusted by lever 32, mounted on pivot 33, and screw 34, which acts to raise or lower the end of lever 32 to which spring 26 is fastened to increase or decrease the tension in spring 26. Pressure roller 24 may be raised to permit insertion of the wire 19 by moving the lower end of lever 28 toward pivot 33, to move pressure roller 24 upward. Lever 28 may be held in this position by engaging hook 35 on the lower end of lever 28 in notch 37 on bar 39, also mounted on pivot 33. Stop 41 on the other end of the bar 39 retains hook 35 and lever 28 on the bar 39 when lever 28 is in the released, or normal operating, position and no wire is between rollers 22, 24.

Pressure plate 23 is adjusted to provide sufficient drag on wire 19 to require the wire to be positively drawn past the measuring wheel 22. This prevents the wires from accidentally moving the wheel through their inherent springiness. Pressure roller 24 is adjusted so as to insure that the measuring wheel 22 rotates whenever the wire 19 is drawn past the wheel.

Before presenting a detailed description of the remainder of the components of measuring apparatus 17, a brief description will afford a general understanding of the components and their principle of operation.

As a length of wire 19 is drawn past the wheel, the measuring wheel 22 is rotated by the wire, thus converting the linear motion of the wire to rotary motion. The rotary motion of wheel 22 operates a tape carrying mechanism or the like in the measuring apparatus 17 which reconverts that rotary action motion to linear motion on a reduced scale to drive a tape, chain or other elongated means contained in the transport mechanism, a given distance which may be proportional to, but lesser than, the length of wire 19 moved past measuring wheel 22.

Thus the distance the elongated or linear means moves may be used to determine when a desired length of wire 19 has been drawn past measuring wheel 22 since the movement of the linear means is proportional to the movement of wire 19. To make this determination, a means responsive to the movement of the linear means is positioned in the tape carrying or transport mechanism to provide an output signal when the linear means has travelled a distance proportional to the desired length of wire.

Further, by varying the distance the linear means travels in the transport mechanism before actuating the responsive means, the measured length of wire drawn past wheel 22 may be varied. The distance the linear means travels is controlled by adjusting the initial starting position of the linear means in the transport mechanism to increase or decrease the distance to the responsive means. The initial starting position is varied by means connected to dial 36 which contains indicia indicating the desired measured length.

In order to provide for rapidly repetitive operation, the preferred embodiment of the tape carrying or transport mechanism of the measuring apparatus 17 shown and described herein comprises a pair of tape carriers each having its own tape or other linear means. These two linear measuring means are utilized alternatively so that while one means is performing a measuring operation, the other is being returned to its initial starting position in preparation for the next succeeding measuring operation.

Figures 4, 10:
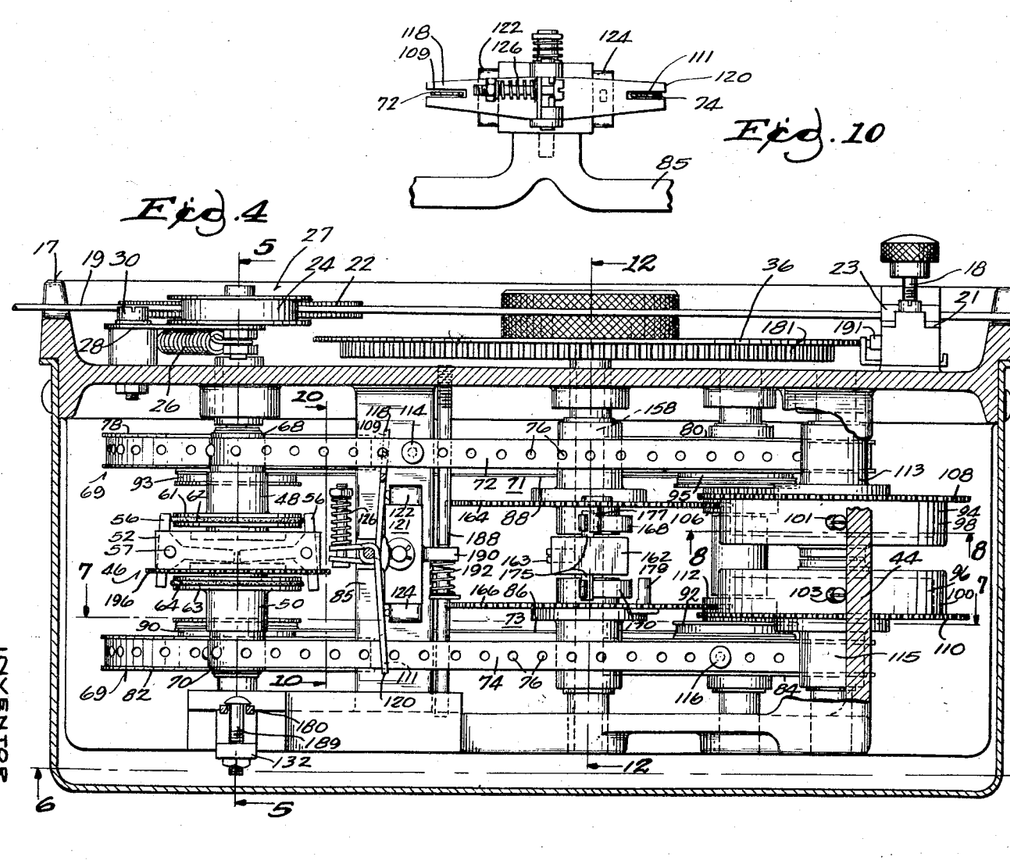
FIGURE 4 is a section taken to present a top view of the measuring apparatus and showing, in general, the measuring elements of the apparatus.
FIGURE 10 is a fragmentary view taken along line 10—10 of FIGURE 4 showing in detail the means responsive to the movement of the linear means.
Figures 5, 11, 14, 15:
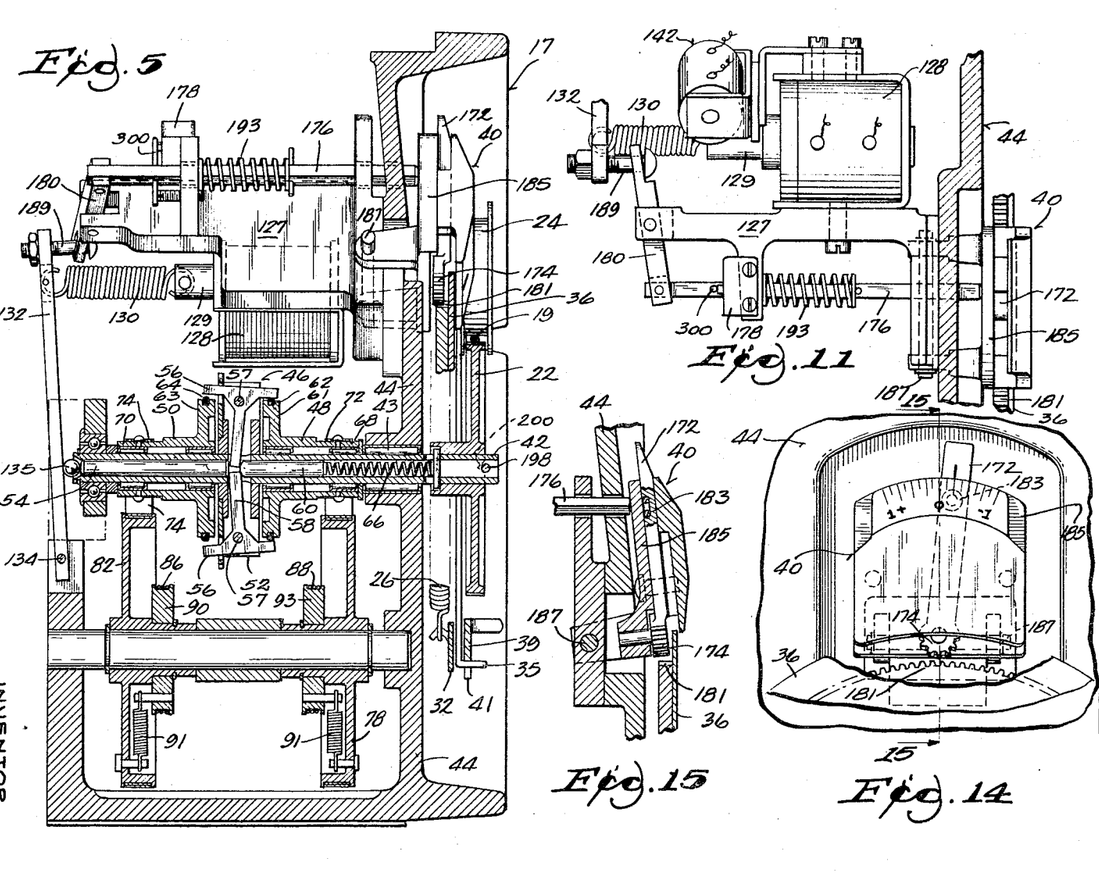
FIGURE 5 is a transverse sectional view taken along the line 5—5 of FIGURE 4.
FIGURE 11 is a view taken along line 11—11 of FIGURE 6, showing certain electro-mechanical components employed to operate the measuring apparatus of the present invention.
FIGURES 14 and 15 are fragmentary views of the mechanism for providing fine adjustments to the measured length, FIGURE 14 being a front view of the measuring apparatus showing the adjustment mechanism and FIGURE 15 being a sectional view taken along line 15—15 of FIGURE 14.

Referring now more in detail, to FIGURES 4 and 5 which show the measuring apparatus 17 as viewed from the top, the measuring wheel 22 is mounted on input shaft 42 journalled in bearings 43 in chassis 44 of apparatus 17. Bearings 43 may be of the one way type which permit rotation only in the direction that wire 19 rotates wheel 22. Mounted in the center of shaft 42 is clutch 46. Input shaft 42 serves as a source of input power to this clutch, which has two output shafts 48 and 50 surrounding the input shaft 42. Clutch 46 couples either output shaft 48 or output shaft 50 to input shaft 42 but only one output shaft is coupled to input shaft 42 at any given time.

Clutch 46 may be any commonly used mechanism for selectively coupling either of two output shafts to a single input shaft. One such mechanism is shown in FIGURES 4 and 5 as having a clutch housing 52 mounted on input shaft 42. For use with clutch 46, the input shaft 42 may be in the form of a hollow quill encircling a slidable coaxial rod 54. A pair of diametrically opposed clutch pawls 56 are pivotally mounted as at 57 at opposite ends of the clutch housing 52. Each clutch pawl 56 is T-shaped with the stem portion 58 of each pawl extending inwardly toward the other and toward the axis of the shaft 42 for engagement between the adjacent faces of rods 54, 60. Pawls 56 may thus be rocked about their pivots 57 upon axial movement of rod 54.

Pawls 56 alternately engage output members 61 and 63 mounted on output shafts 48 and 50, respectively, and having clutch facings 62 and 64 attached thereto. The clutch facing 62 and 64 may each consist of a resilient ring, such as an O-ring, which the pawls 56 instantaneously engage when pivoted toward the respective facings to thereby selectively couple the input shaft 42 to either of the output shafts 48 or 50. The rod 54 is spring loaded as by means of a spring 66 to cause pawls 56 to engage clutch facing 62 when the clutch 46 is not otherwise operated. The rotary motion of the measuring wheel 22 resulting from the passage of the wire 19 is thus supplied to output shaft 48 or 50 depending on the coupling provided by clutch 46.

Output shafts 48 and 50 operate the aforementioned tape carrying or transport mechanism 69. Specifically, the ouptut shaft 48 is connected to a toothed drive sprocket 68, while output shafts 50 is connected to a similar drive sprocket 70. In the illustration, the diameter of each sprocket 68 and 70 is substantially smaller than the diameter of measuring wheel 22, but this is a matter of choice dependent upon the distance it is desired to move the linear or elongated means 72, 74 proportionately to the movement of the wire. These sprockets each move a linear means, such as tapes 72 and 74 as shown, through a series of perforations 76 formed in the tapes and receiving the teeth of drive sprockets 68 and 70, respectively. The tapes 72 and 74 may be made of any suitable material, such as cloth, plastic, or metal. It is essential, however, that the material used for tapes 72 and 74 be selected from one which is relatively inelastic and will not lengthen under tension to any appreciable degree. Further, while the linear means is shown and described in the form of a tape in the present description, it is not restricted to such form. It may be a cable, chain, wire or other means capable of being driven by an appropriate means mounted on the output shafts of clutch 46.

Transport mechanism 69 comprises a pair of tape carrying or transport members 71 and 73, and the tape 72 is contained in transport means 71 while tape 74 is contained in transport means 73. Specifically, the tape 72 extends between and is fastened to the takeup reel 78 and rewind reel 80 of transport means 71; while tape 74 extends between, and is fastened to, the takeup reel 82 and rewind reel 84 of transport mechanism 73. Takeup reels 78 and 82 are mounted beneath sprockets 68 and 70, see FIGURES 6 and 7, while rewind reels 80 and 84 are mounted so as to extend tapes 72 and 74 over a platen 85. Thus the paths of the tapes 72 and 74 extend from rewind reels 80 and 84 across platen 85 over, and around sprockets 68 and 70 and onto takeup reels 78 and 82, respectively. It may be noted from FIGURES 6 and 7 that the tapes are wound in the opposite direction on the take-up reels than they are on the rewind reels.

Figure 6:
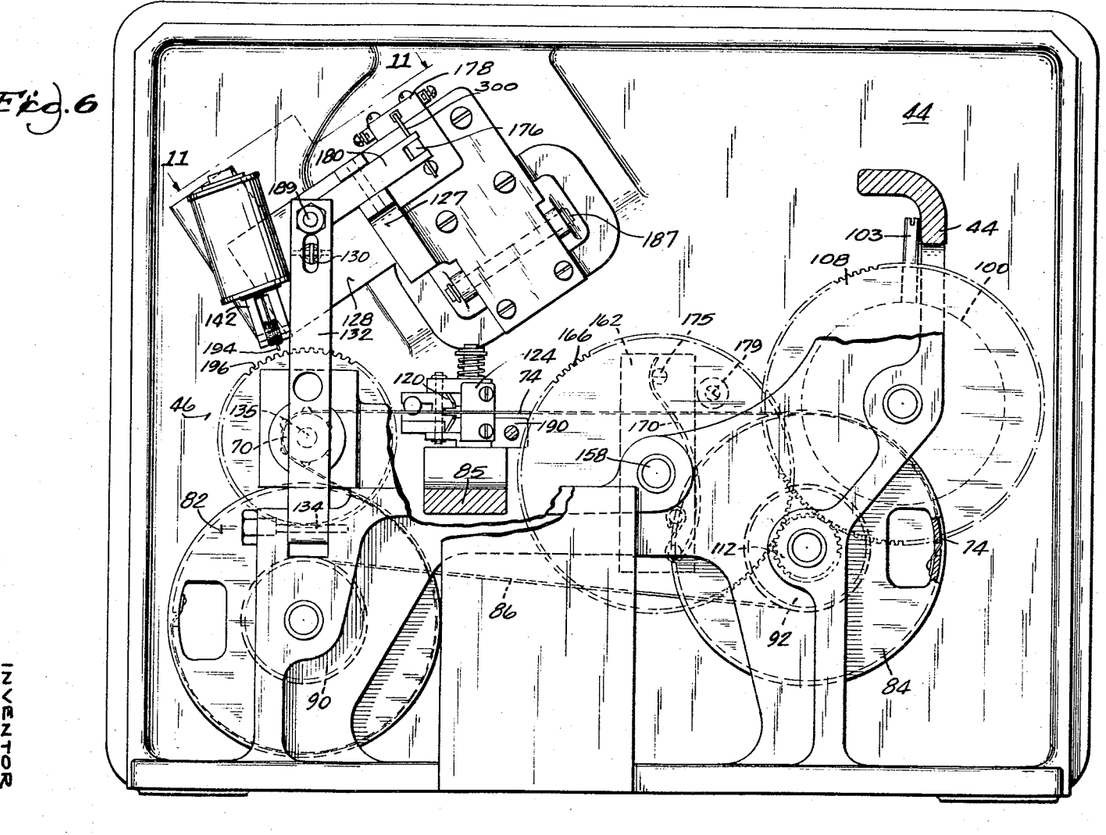
FIGURE 6 is a sectional view of the measuring apparatus taken generally along line 6—6 of FIGURE 4 with parts being broken away to reveal further details of the measuring elements including, in particular, the transport mechanism and certain electro-mechanical components employed in the apparatus.
Figure 7:
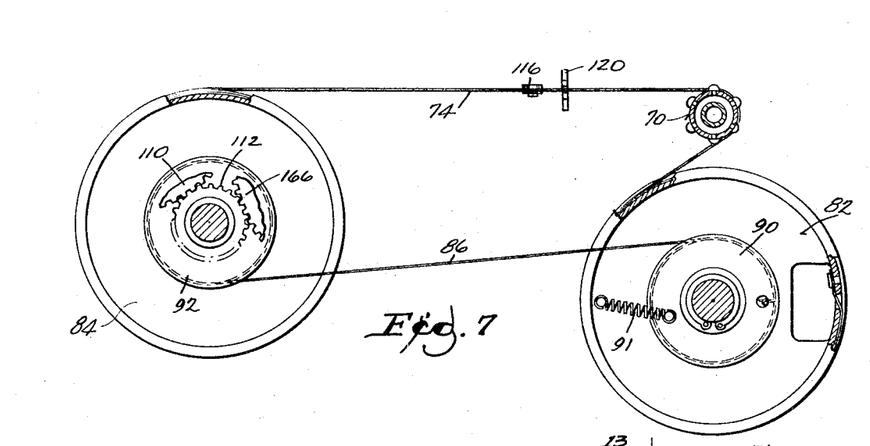
FIGURE 7 is a view taken along line 7—7 of FIGURE 4 showing only the components of the transport mechanism of the measuring apparatus, viewed from the opposite side as seen in FIGURE 6.

Each of the pairs of reels, that is, takeup reel 78 and rewind reel 80, and takeup reel 82 and rewind reel 84, are operated in unison to prevent slack in tapes 72 and 74 by means of steel cables 86 and 88 extending between the takeup and rewind reels. The following is a detailed description of cable 86, shown in FIGURES 6 and 7, it being understood that the cable 88 extending between takeup reel 78 and rewind reel 80 is constructed in a similar manner. Cable 86 is wound on a drum 90 attached to takeup reel 82 and a drum 92 attached to rewind reel 84. Steel cable 86 is wound on each drum in the opposite direction from tape 74 on the associated reel. Specifically, as shown in FIGURE 6, the tape 74 is wound in a clockwise direction on takeup reel 82 while the cable 86 is wound in a counterclockwise direction on drum 90. Tape 74 is similarly wound on the rewind reel 84 in the clockwise direction while the cable 86 is wound on drum 92 in the counterclockwise direction. As shown most clearly in FIGURE 7, the drum 90 is attached to takeup reel 82 through a spring 91 which keeps tension on drum 90 to remove any slack from cable 86.

Each of rewind reels 80 and 84 contains a pinion 106 and 112, respectively, mounted concentrically with the cable drums 92 and 95 for a purpose hereinafter described.

The tapes are alternately advanced from their initial starting position on the rewind reels onto the takeup reels by sprockets 68 or 70 depending on which output shaft clutch 46 has coupled to input shaft 42. The amount that the tape 72 or tape 74 is advanced is proportional but smaller than the length of wire 19 drawn past the measuring wheel 22 due to the fact that the diameter of sprockets 68 and 70 driving tapes 72 and 74 is substantially less than the diameter of measuring wheel 22 which responds to the passage of wire 19 depending on which output shaft the clutch 46 has coupled to input shaft 42. For example, tape 74 is advanced from the rewind reel 84 onto takeup reel 82, that is, to the left as shown in FIGURE 6, by rotation of the sprocket 70 in the counterclockwise direction when driven by measuring wheel 22 through clutch 56. This moves rewind reel 84 in the counterclockwise direction as tape 74 is unreeled. The unreeling of tape 74 causes the cable 86 to be taken in on drum 92 which moves takeup reel 82 in the clockwise direction because of the pull exerted on cable 86. The clockwise rotation of takeup reel 82 serves to gather tape 74 on the reel 82.

Tape 72 is advanced from rewind reel 80 onto takeup reel 78 by a similar rotation of sprocket 68 when driven by clutch 46. The unreeling of tape 72 from rewind reel 80 causes cable 88 to be taken in on drum 93 which moves takeup reel 80 in a direction to take up tape 72 because of the pull exerted by cable 88.

Each of tapes 72 and 74 contains an actuator 114 and 116 mounted thereon which provides an indication of the distance tapes 72 and 74 are moved by sprockets 68 and 70. These actuators may take the form of a rivet or other projection extending from the surface of tapes 72 and 74. The actuators 114 to 116 are formed to strike switch leaves 118 and 120, positioned across the tapes, as tapes 72 and 74 are advanced from their initial starting position on rewind reels 80 and 84 toward takeup reels 78 and 82. Tapes 72 and 74 may fit in slots 109 and 111 in switch leaves 118 and 120 for this purpose, as shown in FIGURE 10. The switch leaves 118 and 120 are normally spring loaded against limit switches 122 and 124, mounted on block 121, by spring means 126 which draws the ends of switch leaves 118 and 120 together. When, for example, actuator 114 strikes switch leaf 118, the latter element is moved out of contact with limit switch 122 thereby operating the switch. Actuator 116 performs a similar operation, on switch 124. Thus, switches 122 and 124 form a means responsive to the movement of tapes 72 and 74.

The switches 122 and 124 are, in turn, connected to the cutoff machine, imprinting device, or other apparatus associated with the measuring apparatus of the present invention. Further, switches 122 and 124 are connected to a means for operating a clutch 46 so as to decouple one of the output shafts from input shaft 42 and couple the other output shaft when one limit switch is operated and to perform the reverse operation when the other limit switch is operated. As shown in FIGURES 5, 6 and 11, this means may comprise a solenoid 128, the armature 129 of which is connected through the spring 130 to a shifter bar 132 extending across the end of rod 54 and connected to chassis 44 at pivot 134. Ball 135 forms a bearing between shifter bar 132 and rod 54. Solenoid 128 and the associated apparatus is mounted on frame 127 attached to chassis 44.

The armature 129 of solenoid 128 moves from an extended position, shown in FIGURE 5, when solenoid 128 is deenergized to a retracted position when solenoid 128 is energized. With the solenoid 128 deenergized and armature 129 in the extended position, the loading provided to rod 54 by spring 66 is sufficient to move the rod 54 outwardly so that pawls 56 engage clutch facing 62 and couple input shaft 42 to output shaft 48 to drive transport means 71. When solenoid 128 is energized, armature 129 is retracted. This exerts sufficient force on rod 54, through spring 130 and shifter bar 132 to move the rod against the loading pressure exerted by spring 66 and pivot the pawls 56 from clutch facing 62 to clutch facing 64 and thereby drive output shaft 50 and transport means 73. Control of the energization of solenoid 128 therefore controls which of transport means 71 or 73 will be driven by clutch 46.

Figure 9:
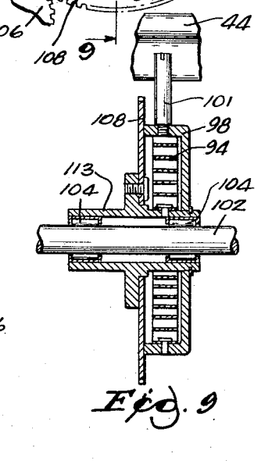

A clock spring mechanism is employed to rewind the tapes from the takeup reels 78 and 82, back on to the rewind reels 80 and 84, after they have been advanced from these reels to the takeup reels 78 and 82 by drive sprockets 68 and 70 and after either of the sprockets is decoupled from the input shaft 42 by the operation of solenoid 128 on clutch 46. Clock springs 94 and 96 are fitted in spring cages 98 and 100, see FIGURES 4, 6, 8 and 9. One end of each clock spring 94 and 96 is fastened to its spring cage 98 and 100 while the other end is fastened to a rotating hub 113 and 115 respectively. This is seen most clearly in FIGURES 8 and 9 which show, in detail, spring cage 98. Thus, one end of spring 94 is secured as by a rivet 302 to hub 113 while the other end is secured to spring cage 98 as by a rivet 304. Hubs 113 and 115 are rotatably mounted on shaft 102 by bearings 104 so as to be free to rotate thereon in a direction to compress springs 94 and 96; i.e., in the counterclockwise direction in FIGURE 8. Rotation of spring cages 98 and 100 is prevented by rods 101 and 103 which abut a portion of chassis 44.

Hub 113 has a gear 108 attached coaxially thereto, while spring hub 115 has attached thereto a gear 110. These gears mesh with pinion gears 106 and 112 mounted on the rewind reels 80 and 84 and thereby connect the springs 94 and 96 to transport means 71 and 73 respectively.

Clock springs 94 and 96 are compressed as tapes 72 and 74 are advanced onto takeup reels 78 and 82 by drive sprockets 68 and 70. Using the transport means 73 which carries tape 74 shown in FIGURE 7, as an example, gear 110 meshed in pinion 112 mounted on the rewind reel 84 rotates hub 115 in a clockwise direction to compress the spring 96 when pinion 112 and rewind reel 84 are rotated as the tape 74 is reeled off rewind reel 84 onto takeup reel 82. When clutch 46 is disengaged to uncouple sprocket 70 from input shaft 42, the compressed spring 96 rotates gear 110 in a counterclockwise direction to rotate rewind reel 84 and pinion 112 in a clockwise direction to reel the tape 74 back onto rewind reel 84. At the same time, rewind reel 84 pays out cable 86 from drum 92 to allow takeup reel 82 to unwind.

It will be understood that spring 94 acts in a similar manner to retract tape 72 after it has been advanced by sprocket 68.

Figure 12:
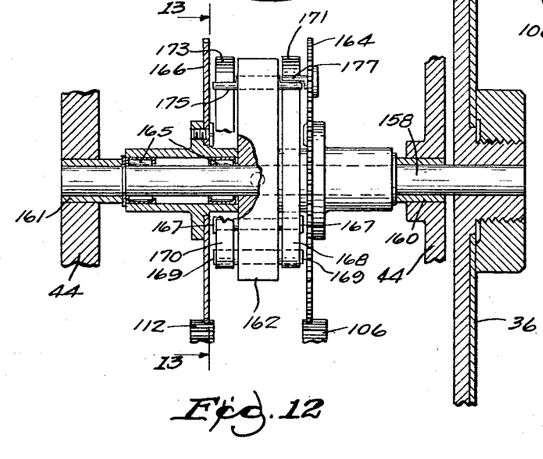
FIGURES 12 and 13 are sectional views of the means to adjust the measured length, FIGURE 12 being taken generally along line 12—12 of FIGURE 4 but omitting numerous elements for clarity and FIGURE 13 being taken along line 13—13 of FIGURE 12.
Figure 13:
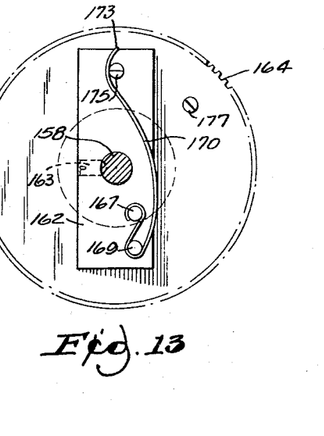

Dial 36 is employed to fix the initial starting position of tapes 72 and 74 and actuators 114 and 116 as they are rewound onto rewind reels 80 and 84 and thus determine the distance which actuators 114 and 116 must travel before striking switch leaves 118 and 120 positioned across the tapes. This distance, in turn, determines the length of wire 19 that will be measured by measuring apparatus 17. Specifically, dial 36, containing indicia 37, indicating the desired length to be measured, is mounted on a shaft 158 journalled in bearings 160 and 161 in the chassis 44. (See FIGURES 12 and 13.) Shaft 158 includes a bar 162 fastened thereon by pin 163 so as to be movable when dial 36 is rotated. Bar 162 contains antibacklash springs 168 and 170, constructed of stiff spring material, and anchored by pins 167 and 169. The free ends 171 and 173 of springs 168 and 170 tightly abut stop pin 175. As seen in FIGURE 12, the upper half of the exposed portions of stop pin 175 is removed for a purpose hereinafter explained.

A pair of gears 164 and 166 are rotatably mounted on shaft 158 as by bearings 165. These gears mesh with pinion gears 106 and 112 and rewind reels 80 and 84 and are free to drive, and be driven by, the pinions 106 and 112. Gears 164 and 166 contain pins 177 and 179, the bottom halfs of which are removed so as to clear stop pin 175 when pins 177 and 179 contact antibacklash springs 168 and 170, as shown by pin 177 in FIGURE 12, when the gears 164 and 166 are rotated on shaft 158.

At the start of a measuring operation, pins 177 and 179 are held against antibacklash springs 168 and 170 by the force exerted by clock springs 94 and 96 through the gear trains containing gears 108, 106 and 164 and 110, 112, and 166. Specifically, in FIGURE 6, clock spring 96 urges gear 110 to rotate in the counterclockwise direction. This, in turn urges pinion 112 to rotate in the clockwise direction, reeling in tape 74 on rewind reel 84. Pinion 112 forces gear 166 to rotate in the counterclockwise direction until pin 179 strikes antibacklash spring 170, where it is held in the position above stop pin 175 to arrest all movement in the gear train.

During a measuring operation, when tape 74 and actuator 116 are driven toward switch leaf 120 by sprocket 70, the rewind reel 84 and pinion 112 are rotated in a counterclockwise direction. Gear 166, meshing with pinion 112, is driven in a clockwise direction to move pin 179 away from spring 170 as shown in FIGURE 6. Pinion 112 also rotates gear 110 in the clockwise direction to compress clock spring 96.

When the actuator 116 strikes switch leaf 120 the measuring operation performed by tape 74 is completed and sprocket 70 is uncoupled from input shaft 42 by the operation of solenoid 128 on clutch 46, permitting the tape 74 to be retracted onto rewind reel 84. Clock spring 96 rotates gear 110 in the counterclockwise direction to drive pinion 112 and rewind reel 84 in the clockwise direction to rewind tape 74. Pinion 112 drives gear 166 in the counterclockwise direction until pin 179 strikes antibacklash spring 170. After a slight flexure, antibacklash spring again positions pin 179 above stop pin 175 as shown in FIGURE 6. This halts all movement of the gear train, stops the rewinding of tape 74 onto rewind reel 84, and determines the initial starting position of actuator 116.

Actuator 116 is accurately relocated in its initial starting position without looseness or play by the opposing forces exerted by the gear train, antibacklash spring 170 and clock spring 96. Tape 74 is now ready to be advanced toward switch leaf 120 to perform another measuring operation.

When sprocket 68 moves tape 72 and actuator 114, the operation of transport means 71 is similar to the above described operation of tape transport means 73.

As previously noted, the amount by which tapes 70 and 74 may be rewound on rewind reels 80 and 84, and hence the initial starting position of actuators 114 and 116, is determined by the position of antibacklash springs 168 and 170 which arrest the motion of rewind reels 80 and 84 when pins 177 and 179 strike the springs. Thus, the initial starting position of actuators 114 and 116 may be varied by changing the position of antibacklash springs 168 and 170 to permit gear 164 and pinion 106 and gear 166 and pinion 122 to rotate a greater or lesser amount. Varying the initial starting position of actuators 114 and 116 varies the distance the actuators must travel before striking switch leaves 118 and 120 and hence the length of linear material 19 that will be measured by measuring apparatus 17.

If the initial starting position of actuators 114 and 116 is moved toward the switch leaves 118 and 120, the distance the actuators must travel before striking the leaves is shortened as is the length of material that will be measured. If actuators 114 and 116 are moved away from the switch leaves 118 and 120 onto rewind reels 80 and 84, the distance the actuators must travel before striking the leaves is lengthened as is the length of material that will be measured.

The initial starting position of actuators 114 and 116 is varied by rotating dial 36 and shaft 158 containing bar 162 on which antibacklash springs 168 and 170 are mounted. For example, if the shaft, bar and antibacklash springs are rotated in the clockwise direction, as viewed in FIGURE 6, antibacklash springs 168 and 170 force the gears 164 and 166 to rotate in the same direction through pins 177 and 179 as the springs are moved. Gears 164 and 166 in turn rotate pinions 106 and 112 to move rewind reels 80 and 84 in a counterclockwise direction so that lesser amounts of tapes 72 and 74 are initially wound onto reels 80 and 84, thus advancing the initial starting position of actuators 114 and 116 and reducing the distance tapes 72 and 74 must move before the actuators strike switch leaves 118 and 120. Shaft 158 is then locked in the new position as hereinafter described.

During the measuring operation, pins 177 and 179 are pulled away from antibacklash springs 168 and 170 for repositioning as gears 164 and 166 are rotated by pinions 106 and 112 when the tapes 72 and 74 are fed onto takeup reels 78 and 82. After actuators 114 and 116 strike switch leaves 118 and 120 and during the rewinding operation, gears 164 and 166 are rotated by clock springs 96 and 94 until pins 177 and 179 strike the antibacklash springs. After proportionately lesser amounts of tapes 72 or 74 have been wound onto the rewind reels 80 or 84 as the case may be, the pins 177 and 179 will again strike antibacklash springs 168 and 170 thus stopping the rewinding of the tapes and determining the initial starting position of actuators 114 and 116.

When shaft 158 is rotated in the counterclockwise direction as viewed in FIGURE 6, a greater amount of the tapes 72 and 74 are wound onto rewind reels 80 and 84 during the rewinding operation, thereby moving the initial starting position of the actuators 114 and 116 away from switch leaves 118 and 120 and increasing the distance actuators 114 and 116 must move before striking switch leaves 118 and 120 to determine the measured length of wire 19.

A fine adjustment mechanism 40 rotates the dial 36 a small amount to provide measurements of lesser length than the large increments indicated on the dial. As shown in FIGURES 3, 14 and 15, a small pinion 174 having a lever 172 affixed to one portion of the circumference is mounted on mounting plate 185 so as to engage gear teeth 181 on the dial 36. Movement of pinion 174 by lever 172 rotates dial 36 a small amount in either direction from the setting provided by the indicia 37 on dial 36. The setting is maintained by the friction between O-ring 183, contained in lever 172, and mounting plate 185. Spring loaded pin 191 bearing against the edge of dial 36 may also be provided to maintain the dial setting. Mounting plate 185 is pivotally attached to frame 127 by pivot 187 as shown in FIGURES 14 and 15, so that pinion 174 may be removed from engagement with gear teeth 181 by tilting mounting plate 185 inward towards chassis 44 to allow dial 36 to be rotated freely.

Dial 36 is permitted to rotate rewind reels 80 and 84 through gears 164 and 106 and 166 and 112, respectively, to move tape 72 and 74 and position actuators 114 and 116 without damaging clutch 46 by means of a disengaging structure which disengages pawls 56 from both clutch facing 62 and clutch facing 64 during such times to permit all elements of transport means 71 and 73 to be freely moved. The disengaging structure includes shaft 176, journalled in frame 127, one end of which abuts the rear surface of mounting plate 185. The other end is connected to pivoted link 180 which is joined, through bolt 189, to the upper end of shifter bar 132. Pin 300 extending from shaft 179 operates solenoid disconnect switch 178. The shaft 176 is spring loaded by spring 193 into abutment with mounting plate 185.

When mounting plate 185 is tilted inwardly to remove pinion 174 from gear teeth 181, shaft 176 is moved to the left as viewed in FIGURES 5 and 11. This causes link 180 to move shifter bar 132 and rod 54 to position clutch pawls 56 so that they are in a neutral position engaging neither of the clutch facings 62 or 64 and allows dial 36, through gears 164 and 166 and pinions, to move rewind reels 80 and 84 and the other elements of transport means 71 and 73 freely, without damage thereto. Additionally, pin 300 is moved away from switch 178, permitting that switch to open, to disconnect solenoid 128 to insure that it will not accidentally become energized to control operation of the clutch 46 during the adjustment operation.

Figure 16:
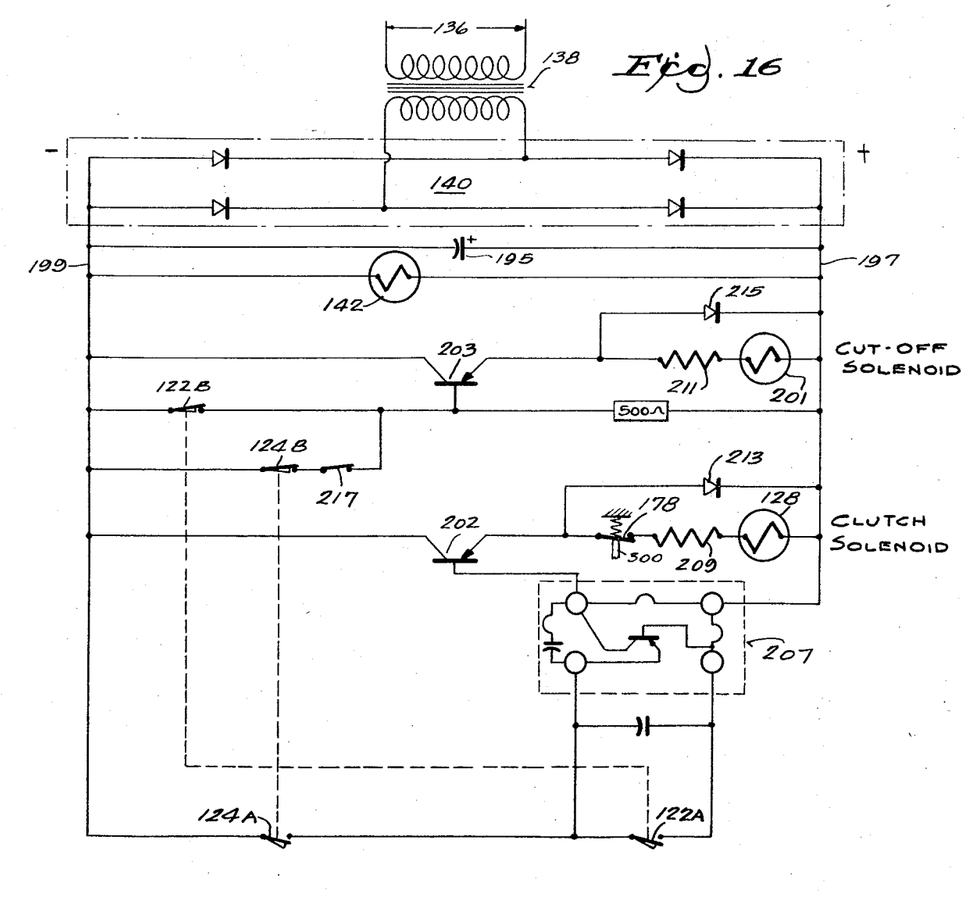
FIGURE 16 is a wiring diagram for the measuring apparatus of the present invention.

A schematic diagram of a wiring circuit that may be utilized with the present invention is shown in FIGURE 16. Power is supplied to the circuit through alternating current input lines 136 to transformer 138. Transformer 138 is connected to rectifier bridge 140 which supplies direct current to conductors 197 and 199 through capacitor 195. A safety solenoid 142, hereinafter described, is installed across conductors 197 and 199 to render measuring apparatus 17 inoperable in the event of a power failure. Solenoid 128 is also connected across lines 197 and 199 so as to be actuated by switches 122 and 124. Switches 122 and 124 have two sets of contacts, one set, 122A and 124A, to actuate clutch solenoid 128, the other set, 122B and 124B, to actuate a solenoid 201 or other output device located in the cutoff, imprinting, or other apparatus associated with measuring apparatus 17.

The solenoids are actuated by biasing transistors 201 and 203 to the conductive state so as to pass current through the coils of the solenoids. Transistors are used for fast response time, it being understood that conventional relays may be used if desired. Resistor 205 forms the biasing circuit for transistor 203 and provides the necessary base current to the transistor whenever switch 122 or 124 is operated. A biasing module 207 is included in the base circuit of transistor 202 to energize solenoid 128 when switch 122 is operated and to deenergize solenoid 128 when switch 124 is operated.

Solenoid disconnect switch 178 is connected in series with solenoid 128 to disconnect that solenoid when dial 36 is rotated. Each solenoid is provided with a resistor 209 and 211 and a discharge diode 213 and 215 to increase the performance. Switch 217 is included in series with switch 124 which when opened prevents the operation of switch 124 from effecting transistor 203. As described below, this permits the measured length to be doubled as only switch 122 is operable to energize solenoid 201.

The operation of measuring apparatus 17 is as follows. Wire 19 is placed in the apparatus by positioning it between pressure plate 21 and pressure pad 23 and between knurled measuring wheel 22 and pressure roller 24. The desired length of measurement is set on dial 36 by pressing fine adjustment mechanism 40 towards chassis 44 to disengage pinion 174 from gear teeth 181, and rotating dial 36 so that the correct indicia 37 appears under hairline 38. During the adjusting operation, fine adjustment mechanism 40 completely disengages clutch 46 from both output shafts 48 and 50 by means of shaft 176 and allows dial 36 and the elements of transport means 71 and 73 to be moved.

The rotation of dial 36 rotates shaft 158 and antibacklash springs 168 and 170 mounted on bar 162. Movement of the antibacklash springs moved gears 164 and 166 which in turn rotates rewind reels 80 and 84 to determine the initial starting position of actuators 114 and 116. The distance between the initial starting position of the actuators and switch leaves 118 and 120 must be proportional to the desired measured length of wire.

Specifically, if a short length of wire is desired actuators 114 and 116 are moved towards switch leaves 118 and 120 whereas if a longer length is required, actuators 114 and 116 are retracted onto rewind reels 80 and 84. Both actuators 114 and 116 are placed the same distance from switch leaves 118 and 120.

When the desired setting has been obtained on dial 36, fine adjustment mechanism 40 is returned to its normal position allowing pinion 174 to re-engage gear teeth 181 on dial 36. Fine adjustments to the desired length may then be obtained by moving lever 172 to rotate dial 36 a small amount by means of pinion 174. The return of fine adjustment mechanism 40 to the forward position moves pin 300 into contact with switch 178 to prepare solenoid 128 for operation. Assuming solenoid 128 to be deenerergized, shifter bar 132 operates clutch 46 to engage pawls 56 on clutch facing 62 to connect input shaft 42 to output shaft 48, as shown in FIGURE 5, preparing transport means 71 for operation.

As wire 19 is drawn past measuring wheel 22, the wheel is rotated. This rotates sprocket 68 to advance tape 72 and actuator 114 from the initial starting position toward switch leaf 118. This distance actuator 114 is moved is proportional to the length of wire drawn past measuring wheel 22.

Wire 19 continues to be drawn past measuring wheel 22 until actuator 114 has moved the entire distance from its initial starting position on rewind reel 80 into contact with switch leaf 118. At this point the desired length of wire 19 has past measuring wheel 22 and actuator 114 operates limit switch 122 to energize a cutoff machine or other device associated with measuring apparatus 17 by means of contacts 122A.

Limit switch 122 also energizes solenoid 128 through contacts 122B and bias module 207 to retract armature 129 and cause shifter bar 132 to decouple pawls 56 of clutch 46 from clutch facing 62 and couple the pawls to clutch facing 64 to drive sprocket 70.

When output shaft 48 is decoupled from input shaft 42 sprocket 68 is no longer capable of driving transport means 71. Clock spring 94 which has been compressed as sprocket 68 advances tape 72 rewinds tape 72 onto rewind reel 80 by means of gear 108 meshed in pinion 106. The rewinding of tape 72 continues until pin 177, driven by gear 164, which also meshes with pinion 106, strikes antibacklash spring 168. After a slight rebound, antibacklash spring 168 returns pin 177 to the position adjacent stop pin 175, thus accurately positioning actuator 114 to the initial starting position for a subsequent measuring operation. Actuator 114 is held in that position, without backlash, or free play by the opposing force of clock spring 94 and antibacklash spring 168 against pin 177.

The next measuring operation of measuring apparatus 17 is performed by transport means 73 for tape 74 as sprocket 70 is now driven by input shaft 24. This transport means functions the same as tape transport means 71. That is, as measuring wheel 22 is rotated due to the passage of wire 19, sprocket 70 advances tape 74 and actuator 116 towards switch leaf 120. When actuator 116 strikes switch leaf 120, switch 124 is actuated, indicating that the desired measured length of wire 19 has again past measuring wheel 22. Another output signal is sent to the cutoff device indicating that measuring apparatus 17 has performed another measuring operation. The operation of switch 124 energizes bias module 207 through contacts 124A to deactivate solenoid 128, Deactivation of solenoid 128 extends the armature 129 allowing spring 130 to move shifter bar 132 so that the pawls 56 of clutch 46 engage clutch face 62 preparing tape transport mechanism 71 for operation. Tape 74 is rewound and accurately positioned on rewind reel 84 in the same manner as tape 72 was rewound onto rewind reel 80. The above described alternate cycle of operation continues for as many measuring operations as desired.

In order to assure that identical measurements are obtained from each tape transport means, an adjustment is provided to switches 122 and 124. The switches are mounted on block 121 which is pivotally mounted on platen 85. The position of the switches about the pivot is determined by adjusting screw 188 which abuts projection 190 extending from block 121. The block is retained in position by spring 192 also bearing on projection 190. If one transport means 71 or 73 is consistently producing measurements different in length than those produced by the other tape transport means, this difference may be equalized by advancing one switch leaf and retracting the other so as to equalize the difference in measurement.

As shown in the schematic wiring diagram of FIGURE 16, a doubler switch 217 may be included in the circuit. When this switch is opened, the operation of switch 124 is ineffective to energize solenoid 201 through transistor 203. Only switch 122 is able to energize solenoid 201. As this switch is operated only every other measuring operation of the transport means 71 and 73, an output signal will be provided from cutoff solenoid 201 at the end of every two measuring operations of the tape transport means. Thus, the measured length of wire 19 will be double that obtained if an output signal was provided by cutoff solenoid 201 at the end of every measuring operation. This permits measuring apparatus 17 to measure a length of material twice the maximum length which may be measured by a single transport means.

Additional major changes to the length of material measured by measuring apparatus 17 may be obtained by changing the position of actuators 114 and 116 on tapes 72 and 74 respectively. For this purpose, actuators 114 and 116 may be formed so as to be capable of removal from one location in the perforations 76 in tapes 72 and 74 and reinsertion in another location. By changing the position of the actuators on the tapes the range of measurements obtainable from one revolution of dial 36 is altered.

In the event of a failure of electric power to measuring apparatus 17, means are provided to insure that the apparatus is rendered incapable of operation so as to prevent faulty measurements. Solenoid 142 is connected across conductors 197 and 199. When energized the armature of solenoid 142 is held in a retracted position removing stop plate 194 from the teeth of gear 196 mounted on clutch housing 46. In the event of a power failure, solenoid 142 is deenergized, dropping stop plate 194 into gear 196 preventing clutch housing 52 and input shaft 24 from rotating. This protects the tape transport mechanisms 71 and 73. As input shaft 42 is locked, rotation of the measuring wheel 22 by wire 19 continuing to pass thereover, will cause torque pin 198 to slip out of groove 200 after an extremely small amount of rotation, freeing measuring wheel 22 from input shaft 24 and preventing damage to apparatus 17.

If desired, solenoid 142 may be deenergized when clutch solenoid 128 is deenergized during adjustment of dial 36 of measuring apparatus 17 to change the desired measured length. This prevents wire 19 from passing or moving measuring wheel 22 during such adjustment. This may be done most simply by providing an additional pair of contacts to switch 178 which are placed in series with solenoid 142 so that when switch 178 is opened both solenoid 128 and 142 are deenergized.

I claim:

1. Apparatus for measuring desired lengths of elongated material longitudinally movable along a given path comprising, sensing means interposed in the path of movement of the material and responsive to the passage of the material therethrough, transport mechanism driven by said sensing means and including elongated means movable from a starting position to a limited extent in one direction a distance proportionate to but less than the movement of material as it passes through said sensing means, means responsive to the movement of said elongated means in said one direction for indicating the measurement of the desired length of material, means for disconnecting said transport mechanism from said sensing means at the end of a measurement, and means for returning said elongated means to its starting position for a subsequent measurement.

2. Apparatus according to claim 1, wherein the material is movable along a rectilinear path and the elongated means is movable in a plane parallel thereto.

3. Apparatus according to claim 1, wherein adjusting means is connected to the transport mechanism for varying the distance of travel of the elongated means to thereby cause the responsive means to indicate measurements of varying desired lengths of material.

4. Apparatus according to claim 1, wherein the sensing means includes means for restricting movement thereof to a single direction and means for maintaining tension on the material passing the sensing means.

5. Apparatus according to claim 1, wherein the transport mechanism includes a pair of elongated means arranged and coupled to be alternately moved by the transport mechanism to cause the responsive means to indicate measurements of desired lengths of material.

6. Apparatus according to claim 5, wherein only one of the elongated means is effective to operate the responsive means for indicating the measurement of the desired length of material.

7. Apparatus according to claim 5, wherein each of the elongated means has a separate carrier including a takeup reel and a rewind reel.

8. Apparatus according to claim 7, wherein the sensing means is connected to the carriers for the elongated means by drive means adapted to advance the elongated means onto their respective takeup reels a distance proportionate to the desired length of material and the transport mechanism includes means for rewinding the elongated means onto their respective rewind reels at the end of each measuring operation.

9. Apparatus according to claim 7, wherein the takeup reels and the rewind reels are interconnected for preventing slack in the elongated means during operation.

10. Apparatus according to claim 7, wherein adjusting means is connected to each of the transport mechanisms to vary the distance the elongated means are moved to thereby cause variations in measurement of the lengths of material, the adjusting means including means connected to the rewind reels for determining the effective length of the elongated means.

11. Apparatus according to claim 8, wherein an adjustable spring actuated stop is associated with the rewind reels, the rewind reels being urged toward the spring stop means by means of springs for causing the elongated means to be retracted a like distance at the end of each measuring operation.

12. Apparatus according to claim 1, wherein the elongated means is a tape.

13. Apparatus according to claim 12, wherein the tape is provided with a switch actuator carried thereby for operating the means responsive to the movement thereof.

14. Apparatus according to claim 13, wherein the means which is responsive to the movement of the tape includes a limit switch operable by the actuator.

15. Apparatus according to claim 14, wherein the transport mechanism includes a pair of tapes each provided with a switch actuator and the means responsive to the movement of the tape includes a limit switch operable by the respective actuators and adjustable to provide like measurements from both tapes.

16. Apparatus according to claim 7, wherein the sensing means drives a clutch which in turn alternately drives the carriers for the elongated means.

17. Apparatus according to claim 16, wherein the clutch is operated by the means responsive to the movement of the elongated means to alternately couple the carriers with the sensing means.

18. Apparatus according to claim 14, wherein means is provided for preventing operation of the apparatus in the event of an electrical power failure rendering the limit switches inoperable.

19. Apparatus according to claim 17, wherein an adjusting means is connected to the transport mechanism to vary the extent of movement of the elongated means, the adjusting means including means for preventing the responsive means from operating the clutch when adjustments are being effected.

20. Apparatus according to claim 13, wherein said switch actuator is removable from said tape, thereby to alter the range of measurements of said apparatus.

References Cited

UNITED STATES PATENTS 788,914   5/1905   King ________________ 33—141

LEONARD FORMAN, *Primary Examiner.*

F. J. D'AMBROSIO, *Assistant Examiner.*

U.S. Cl. X.R.

226—100; 242—57